United States Patent [19]

Schilling

[11] Patent Number: 5,443,632
[45] Date of Patent: Aug. 22, 1995

[54] CATIONIC AQUEOUS BITUMINOUS EMULSION-AGGREGATE SLURRIES

[75] Inventor: Peter Schilling, Charleston, S.C.

[73] Assignee: Westvaco Corporation, New York, N.Y.

[21] Appl. No.: 200,386

[22] Filed: Feb. 23, 1994

[51] Int. Cl.6 .......................................... C09D 195/00
[52] U.S. Cl. ................................................ 106/277
[58] Field of Search ........................................ 106/277

[56] References Cited

U.S. PATENT DOCUMENTS

| | | | |
|---|---|---|---|
| 4,447,269 | 5/1984 | Schreuders et al. | 106/277 |
| 4,450,011 | 5/1984 | Schilling et al. | 106/269 |
| 4,462,840 | 7/1984 | Schilling et al. | 106/277 |
| 4,464,286 | 8/1984 | Schilling | 106/277 |
| 4,547,224 | 10/1985 | Schilling | 106/273 |
| 4,561,901 | 12/1985 | Schilling | 106/277 |
| 4,597,799 | 7/1986 | Schilling | 106/277 |
| 4,810,299 | 3/1989 | Schilling et al. | 106/277 |
| 4,861,377 | 8/1989 | Schilling | 106/277 |
| 4,877,457 | 10/1989 | Schilling et al. | 106/277 |
| 4,957,560 | 9/1990 | Schilling | 106/277 |
| 5,008,382 | 4/1991 | Schilling et al. | 536/11 |
| 5,034,060 | 7/1991 | Schilling et al. | 106/277 |
| 5,160,453 | 11/1992 | Schilling | 252/311.5 |
| 5,242,492 | 9/1993 | Krivohlavek | 106/269 |

FOREIGN PATENT DOCUMENTS

| | | | |
|---|---|---|---|
| 2126919 | 3/1984 | United Kingdom | 106/277 |

*Primary Examiner*—David Brunsman
*Attorney, Agent, or Firm*—Daniel B. Reece, IV; Terry B. McDaniel; Richard L. Schmalz

[57] ABSTRACT

The present invention relates to mixing-grade, quick-setting, and slow-setting cationic aqueous bituminous emulsion-aggregate paving slurry seal mixtures. More particularly, this invention relates to paving slurry seal mixtures formed with cationic emulsions prepared by emulsifying bitumen (e.g. asphalt) in water with a cation-active emulsifier. The emulsifier is the product of the reaction of polyamines with certain fatty acids and rosins, and a quaternizing agent such as 2,3-epoxy-propyl-trimethyl ammonium chloride or 3-chloro-2-hydroxy propyl-trimethyl ammonium chloride.

33 Claims, No Drawings

CATIONIC AQUEOUS BITUMINOUS EMULSION-AGGREGATE SLURRIES

FIELD OF INVENTION

The present invention relates to mixing-grade, quick-setting, and slow-setting cationic aqueous bituminous emulsion-aggregate paving slurry seal mixtures. More particularly, this invention relates to paving slurry seal mixtures formed with cationic emulsions prepared by emulsifying bitumen (e.g. asphalt) in water with a cation-active emulsifier. The emulsifier is the product of the reaction of polyamines with certain fatty acids and rosins, and a quaternizing agent.

BACKGROUND OF THE INVENTION

Conventionally, emulsion slurry seals are formulated from: (1) mineral aggregate which is a fine stone aggregate and/or mineral filler and (2) about 15%–25% by weight thereof of a mixing-grade, slow-setting emulsion containing from about 50%–75% by weight of bituminous residue (usually asphalt), with a further addition of about 5%–25% of water (based on the weight of the dry aggregate) to attain slurry consistency. Usually, densely-graded aggregates (such as granite screenings, limestone screenings, dolomite screenings, and blast furnace slag) are combined with bituminous emulsions to produce slurry seal compositions. These aggregates range in size from anything passing through a sieve of No. 4 (and even No. 10) mesh, to from 15%–20% passing through as fine a mesh as 200 mesh (as described in ASTM C136).

The advent of slurry seal as a paving and road maintenance technique was first developed for use with anionic aqueous bituminous emulsions. A slurry seal is an intimate mixture of emulsified bituminous material and fine-grained aggregate held in suitable suspension until applied to the road surface. The slurry seal emulsion must be of an oil-in-water type. In such a mixture with aggregate, the aqueous emulsion form of the bituminous material has generally been preferred because it is less hazardous and more economical to use than hot mix or cutback (solvent-containing) asphalts. Furthermore, the aqueous emulsion form can be stored, transported, and applied at much lower temperatures; thereby obviating the necessity of heating equipment to maintain a bitumen-aggregate system in a workable or usable form. While these advances have been recognized, widespread acceptance has not been achieved due to disadvantages found in previous aqueous bituminous emulsions.

More recently, cationic bituminous emulsions have come into use and eliminate many of the disadvantages of the anionic emulsions. Bituminous emulsions formulated using cationic emulsifiers do not "break" in the same manner as anionic emulsions, but rather the bituminous material is deposited from the emulsion due to the attraction of polar charges between the bituminous droplets and negatively charged aggregate surfaces. Thus, cationic bituminous emulsions deposit more rapidly than the anionic bituminous emulsions on aggregate surfaces and are bonded to the aggregate by the electrostatic action at the interface of the bitumen and the aggregate material.

The aqueous cationic bituminous emulsions themselves are relatively stable, and the emulsion stability may be enhanced by various additives well known in the art. Most cationic bituminous emulsions, however, rapidly deposit on the surface of aggregate materials when the aggregate is contacted with the emulsions. Bitumen from an aqueous cationic bituminous emulsion is deposited from the emulsion due to the charge attraction between the bituminous droplets and the aggregate materials. The rapid setting action of cationic bituminous emulsions is of considerable advantage in road building (e.g., seal coats) since the roads can be opened to traffic shortly after application of the coating. Although the rate of asphalt deposition, for example, from the emulsion can be controlled to some extent, the time required for complete deposition is never very long. It is, therefore, the practice to combine the cationic emulsion with the aggregate at the site of road construction (either on the surface of the road itself or in a mobile mixer) thereby permitting the emulsion aggregate mix to be rapidly spread.

Due to the charge attraction mechanism, the rapidity of deposition of bituminous materials depends upon the surface area of the aggregate or filler material. Thus, while a specific cationic bituminous emulsion might provide suitable properties for use in conjunction with some aggregates, the same cationic emulsion may not exhibit suitable properties when used with very finely ground materials having a vastly larger total surface area. The rapid deposition characteristics of the cationic bituminous emulsions frequently makes it impossible to use such emulsions with fine-grained aggregate in slurry form (such as in gun application or spreader box application). As the slurry seal should mix well, pump well, lay down well, not stiffen while being applied, and, after setting, wear well under traffic, it is particularly desirable to be able to control the setting time of the slurry for various aggregates employed.

Acidified reaction products of polycarboxylic acids, anhydrides, sulfonated fatty acids, and epoxidized glycerides with certain polyamines are suitable emulsifiers yielding asphalt emulsions which can be mixed with fine-grained aggregate to give workable aggregate/emulsion mixes.

These emulsifiers generally are disclosed in U.S. Pat. No. 4,447,269 to Schreuders et al., U.S. Pat. No. 4,450,011 to Schilling et al., U.S. Pat. No. 4,547,224 to Schilling et al., U.S. Pat. No. 4,462,840 to Schilling et al., U.S. Pat. No. 4,464,286 to Schilling, and U.S. Pat. No. 4,597,799 to Schilling.

However, cationic emulsions produced with the known emulsifiers can only be mixed with aggregates when the temperature of the emulsion or the aggregate is below 100° F. or when the aggregate surfaces are only moderately charged. In hotter climates (where the temperature of the mixes are as high as 120° F.) or when highly-charged aggregates have to be used, these emulsions fail the mixing process.

Furthermore, attempts to mix cationic emulsions prepared with amidoamines or imidazolines obtained by reacting non-modified fatty acids or rosin with polyethylene amines at ambient temperature (about 60°–85° F.) have not proven successful. Immediate break occurred when the emulsion and the aggregate became into contact.

Accordingly, an object of this invention is to provide novel types of emulsifiers using non-modified fatty acids and rosin which produce mixing-grade emulsions useful in slurry seal applications and emulsifiers which yield emulsions which can be mixed with aggregate at elevated temperatures.

A further objective of this invention is to provide emulsifiers which produce emulsions classified as slow-set by passing the cement mix test according to ASTM D-244.

Another object of this invention is to provide a novel mixture of aggregate and bituminous emulsion.

A further object is to provide a mixture of the above character which is workable under a broad range of conditions.

Another object is to provide a mixture of cationic bituminous emulsion and aggregate whose setting time can be varied.

A particular object is to provide an aqueous bituminous emulsion fine-grained aggregate slurry mixture which deposits at a fairly rapid rate after being applied to the surface to be treated, and is usable for a longer period of time to enable application in slurry form.

SUMMARY OF THE INVENTION

The above objectives are met in the cationic aqueous bituminous emulsion-aggregate slurries formed with cationic emulsions prepared by emulsifying bitumen (such as asphalt) in water with novel cation-active emulsifiers. These emulsifiers are the reaction products of one or more polyamines with fatty acid (or rosin) and a quaternizing agent. The emulsifiers solve the immediate break problem noted above and may be mixed with aggregates when the temperature of the emulsion or the aggregate is at ambient temperature (about 60°-85° F.).

Modified emulsifiers producing emulsions which are capable of being mixed with aggregates when the temperature of the emulsion or the aggregate is about 60°-110° F. are made by reacting one or more polyamines with a fatty acid, rosin, fortified fatty acid, or fortified rosin to form an amidoamine, imidazoline, polyamidoamine, or an imidoamidoamine. This reaction product is further reacted with a quaternizing agent to produce the modified emulsifier.

Additional modified emulsifiers producing emulsions which are capable of being mixed with aggregates when the temperature of the emulsion or the aggregate is about 60°-110° F. are made by reacting a polyamine with sulfonated fatty acids or epoxidized esters of unsaturated fatty esters. The reaction product is further reacted with a quaternizing agent to produce the modified emulsifier.

DESCRIPTION OF THE PREFERRED EMBODIMENT

A typical cationic aqueous bituminous emulsion/aggregate slurry is formulated in the laboratory by mixing a given amount of aggregate pre-wetted with water with a suitable cationic bituminous emulsion to obtain the desired consistency. Suitable consistency is obtained by using mixed gradations of aggregates forming a smooth non-separating uniform mixture of cationic aqueous bituminous emulsion-aggregate which can be evenly spread onto an existing surface. The ultimate toughness of the applied slurry is obtained as the bitumen (such as asphalt) deposits on the aggregate particles and binds the newly applied coating to the pre-existing surface as a mixture of asphalt cement and aggregate.

As a paving technique at the roadsite, a mobile self-propelled unit capable of uniformly metering the various components (i.e., aggregate, water, inorganic or organic additive, and emulsion) may be utilized. A typical unit is equipped with separate tanks for aggregate, water, additive, and emulsion. These components are continually metered into a mixing chamber at a predetermined ratio. The continually-fed components are retained in the mixing chamber for approximately five to ten seconds before being fed into a spreader box and applied to the surface to be coated. Batch operated pneumatic devices can also be used for suitable placement of the cationic bituminous aggregate slurries of this invention.

The paving slurry seal of this invention basically comprises a mixture of aggregate, water, and a bituminous emulsion. Suitable densely graded mineral aggregate will pass through a sieve of No. 4 mesh with at least 80% being retained on a 200 mesh screen. The bituminous emulsion is made up of bitumen emulsified with a cationic emulsifier in water, and is from about 15% to about 25% (based on the weight of the aggregate) of an oil-in-water type emulsion.

Emulsifiers producing emulsions which are capable of being mixed with aggregates when the temperature of the emulsion or the aggregate is about 60°-85° F. are made by reacting in a condensation reaction one or more polyamines with fatty acid (or rosin) and a quaternizing agent.

Modified emulsifiers producing emulsions which are capable of being mixed with aggregates when the temperature of the emulsion or the aggregate is about 60°-110° F. are produced by reacting in a condensation reaction one or more polyamines with a fatty acid, rosin, fortified fatty acid, or fortified rosin to form an amidoamine, imidazoline, polyamidoamine, or an imidoamidoamine. This reaction product is further reacted with a quaternizing agent to produce the modified emulsifier.

Suitable fortified fatty acids (or fortified rosins) are obtained by the condensation reaction of unsaturated fatty acids (or rosin) with acrylic acid, metacrylic acid, fumaric acid, or maleic anhydride of the general formulae:

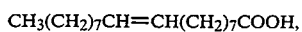

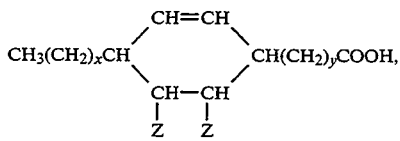

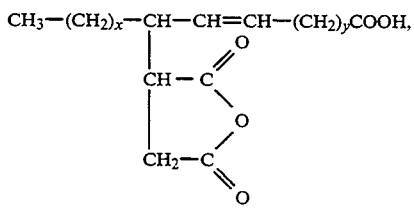

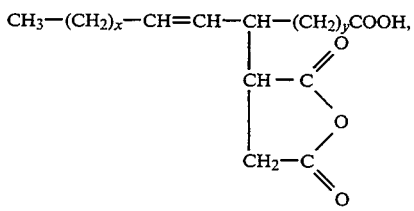

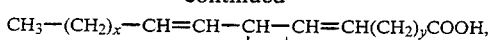

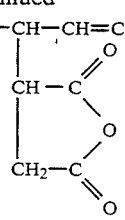

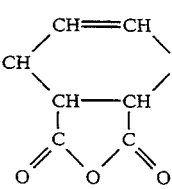

Maleinized Rosin

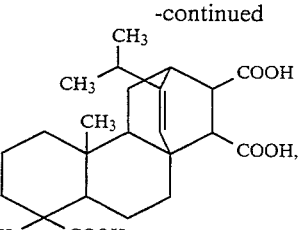

Fumarized Rosin wherein x and y are integers from 3 to 9, x and y together equal an integer from 10 to 14, at least one Z is a carboxylic acid group, and any remaining Z is hydrogen.

The reactions of an amidoamine, imidazoline, polyamidoamine, or imidoamido amine (obtained by condensation of a suitable polyamine with a fatty acid, rosin, fortified fatty acid, and/or fortified rosin at temperatures between 180° C. and 280° C.) with the reactive quaternizing agent is carried out in diluted solutions at a temperature of 30° C. to 100° C. Water, isopropanol, or mixtures of the two may serve as solvents. Emulsifiers containing one or more quaternary ammonium groups can be obtained by nucleophilic substitution at one or more reactive amino groups.

Due to the complexity of the reaction mix, no attempt has been made to isolate individual products. Using the condensation product of oleic acid with diethylene triamine as starting material, the reaction sequence is as follows:

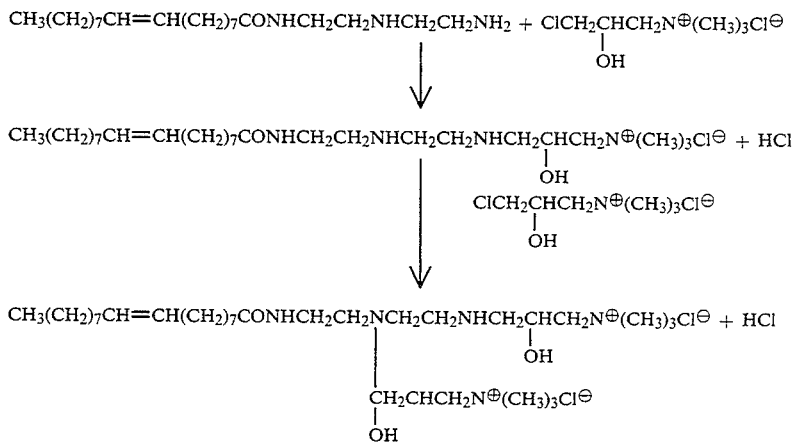

In the case of amidoamines prepared from aminoethyl piperazine or dimethylamino propylamine and a fatty acid, the reaction with the tertiary nitrogen in the six-membered ring system or of the dimethylamino group creates an additional quaternary center as the result of the quaternizing step. For example:

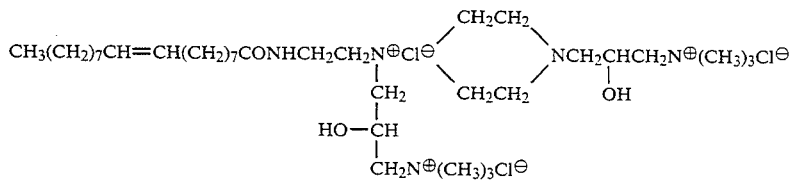

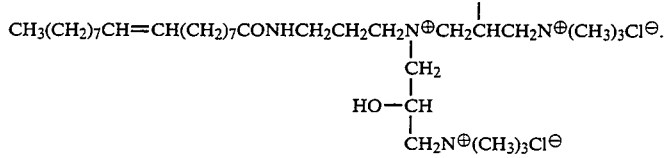

Using polyamidoamines obtained from polycarboxylic acids with the same reagent, a complex mixture of isomers is obtained when the reaction is carried out on a mole-to-mole basis. The condensation product of $C_{21}$-dicarboxylic acid with diethylene triamine may serve as an example:

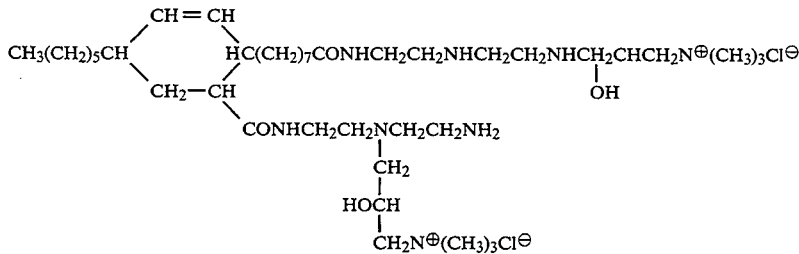

Additional modified emulsifiers producing emulsions which are capable of being mixed with aggregates when the temperature of the emulsion or the aggregate is about 60°–110° F. are produced by reacting a polyamine in a condensation reaction with sulfonated fatty acids or epoxidized esters of unsaturated fatty esters (such as tallates, oleates, linoleates, and glycerides such as vegetable oils and animal fats). The reaction product is further reacted with a quaternizing agent to produce the modified emulsifier. An example of such reactants includes epoxidized glyceride of the formula:

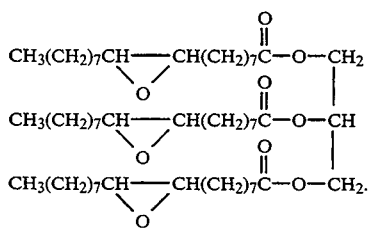

Polyamines which are suitable for use in producing the above noted emulsifiers include, but are not limited to, the following: aminoethylpiperazine, dimethylamino propylamine, ethylene diamine, diethylene triamine, triethylene tetramine, tetraethylene pentamine, pentaethylene hexamine, and higher homologues; N-aminoethyl propane diamine, N,N'diaminoethyl propane diamine, N,N'-diaminoethyl-substituted butane diamines, pentane diamines and hexane diamines, and N-hydroxy ethyl ethylene diamine. These compounds have the general formula:

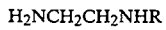

where R=H—, $CH_3$—, $C_2H_5$—, $C_3H_7$—, —$CH_2CH_2OH$, and —$(CH_2CH_2NH)_xH$ where x=1–10; and

where $R_1$=H—, $CH_3$—, $C_2H_5$—, $C_3H_7$—, and $NH_2CH_2CH_2$—; $R_2$=H—, $CH_3$—, and $C_2H_5$—; $R_3$=H—, $CH_3$—, $C_2H_5$—, $C_3H_7$—, and $NH_2CH_2CH_2$—; and y=2–6.

The above polyamines are also able to form imidazolines or amidoamines when reacted with carboxylic acids.

Additional polyamines which are suitable for use in producing the above noted emulsifiers include, but are not limited to, the following: 1,3-diaminopropane, 1,4-diaminobutane, 1,5-diaminopentane, 1,6-diaminohexane, piperazine(1,4-diazacyclohexane), N-aminoethyl-piperazine, N-hydroxyethyl piperazine, N-aminopropyl-propane diamine-1,3, N-methyl-N-aminopropylpropane diamine-1,3, and N-aminohexylhexane diamine-1,6. These polyamines are capable of forming amidoamines, but not imidazolines, when reacted with carboxylic acids.

In addition, polyamines containing other functionalities such as (—O—), thioether (—S—), sulfoxide (—SO—), or sulfone (—$SO_2$—) groups, as well as aromatic structures, are also suitable for condensation. These compounds have the general formula:

where $R_1$=O, S, SO, and $SO_2$, and x=2–10.

Further modifications of the above-described polyaminoamidoamines and imidazolines include their reaction products with reactive oxirane systems such as ethylene oxide, propylene oxide, or butylene oxide. Reaction occurs initially on primary and secondary nitrogens (that is, a nitrogen to which one or two hydrogen atoms are covalently bound). The reaction products belong to the class of N-hydroxyethyl-, N-2-hydroxypropyl-, and N-2-hydroxybutyl-amino amidoamines. If excess oxirane is reacted, polyethylene oxides, polypropylene oxides, or polybutylene oxides are obtained. The hydroxyl groups will also react in this case.

Fatty acids which are suitable for use in producing the above noted emulsifiers contain from 8–20 carbon atoms. Rosins which are suitable for use in producing the above noted emulsifiers contain from 20–22 carbon atoms.

Quaternizing agents which are suitable for use in producing the above noted emulsifiers include: 2,3-epoxy-propyltrimethyl ammonium chloride, 3-chloro-2-hydroxy propyl-trimethyl ammonium chloride (which is commercially available and manufactured by Dow Chemicals, Inc. under the trade name QUAT 188), and the like.

The examples which follow are illustrative of emulsifiers used to obtained cationic asphalt in water emulsions and are eminently useful for mixing under shear with a variety of siliceous and calcareous aggregates. After setting (evaporation of water), the asphalt films show excellent adhesion to the aggregate surface.

In preparing the bituminous emulsions employed in the invention paving slurry seal mixtures, an aqueous acidic solution of the emulsifiers described below is intimately mixed under high shear in a colloid mill. The water content of the emulsion ranges between about 3.0–20.0% by weight of the emulsion. The bitumen content ranges from about 30.0%–80.0% by weight of the emulsion, with the preferred content being about 60.0%–70.0%. The dosage of the emulsifier ranges from about 0.3%–10.0% by weight of the emulsion, with the preferred content being about 0.5%–2.0% by the weight of the emulsion. Dependent on the emulsifier, the slurry grade emulsion has a pH in the range of about 1–7, with the preferred pH range being about 2–3.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted from solvents (cutback asphalts). Practically any viscosity or penetration graded asphalt cement for use in pavement construction as described in ASTM designation D-3381 and D-946 may be emulsified with the aid of the emulsifiers of this invention.

The cationic soap solutions are normally obtained by suspending the amidoamine or imidazoline in water to which a sufficient amount of a suitable acid (e.g., hydrochloric acid, phosphoric acid, or the like) is added until the desired pH value at or below 7 is reached and a clear emulsifier solution is obtained. Thereafter, the soap solution which is preheated to 55° C. and the fluid asphalt which is preheated to 120°–125° C. are mixed under high shear in a colloid mill to give asphalt emulsions of brown color and creamy texture. Prior to testing according to ASTM D-244, the emulsions are stored at 70° C. for 16 hours.

The aggregates of the invention paving slurry seal mixtures are densely graded aggregates which range in size from anything passing through a No. 4 sieve and at least 80% retained on 200 mesh.

Aggregate mixing tests are performed by mixing the aggregate with water and aqueous bituminous emulsion. An inorganic additive-mineral filler (such as Portland cement, hydrated lime, limestone dust, and fly ash) may be added to accelerate set/break time and organic salts (such as ammonium sulfate and/or aluminum sulfate) or emulsifiers may be added to retard the set/break of the slurry system. Such additives shall comply with the requirements of ASTM D-242. The materials are mixed in a mixing bowl until a homogeneous slurry is obtained. The inability to form a stable slurry within three to four minutes of mixing time when proper portions of each of the ingredients are used would indicate a mixture in which the materials are not compatible. This mix design is necessary to simulate field conditions. After the slurry is mixed, it is spread in a mold which is placed on an asphalt felt, and the set/break time is measured by blotting the exposed slurry surface with a paper towel, the slurry is considered to be "set." The cure time could be measured with a cohesion testing device. Many other tests such as described in ASTM D-3910 are used to measure strength and other physical properties of slurry. *The Performance Guide for Slurry Seal* published by the International Slurry Surfacing Association is used to measure the performance of the slurry seal.

The emulsion should be stable during mixing and should set within the designed time period following application. The emulsifiers of this invention perform very satisfactorily without auxiliary emulsifiers. For instance, the mixing performance and setting times can be controlled with the concentration of emulsifier, the addition of lime, cement, or other inorganic or organic additives, which would alter the break characteristics of the slurry system. An organic additive-polymer latex may also be employed to strengthen the matrix. The organic additive is preferably added to the emulsion-aggregate slurry.

Either a mixture of tall oil fatty acids (preferably tall oil pitch) can be added to the bitumen (asphalt) prior to emulsification to improve break or to improve the viscosity of the emulsion; or blends of the above described quaternized amidoamines with compatible cationic or nonionic emulsifiers may be used for the emulsification of the bitumen.

The emulsions prepared with these quaternized polyamidoamide condensates disclosed in this invention are stable and can be stored for a long period of time until required for use. The cationic aqueous bituminous emulsions employed in the invention slurries are slow-setting, mixing grade slurries under ASTM D-2397; however, the set time may be shortened by adding lime or cement to produce an emulsion with quick-setting characteristics. The modification of the emulsion to produce the desired slow-setting or quick-setting characteristics is well within the ability of a skilled artisan.

The practice of this invention may be seen in the following examples wherein the preparation of various types of emulsifiers and types of slurries of the invention is described. The following examples are provided to further illustrate the present invention and are not to be construed as limiting the invention in any manner.

EXAMPLE 1

The general method of the preparation of the quaternary amidoamines, imidoamines, imidazolines and polyamidoamines is as follows: Two hundred and eighty parts of oleic acid were heated with 110 parts of diethylene triamine to 200° C. until all the water of condensation was collected. The intermediate amidoamine was diluted to 50% active in a mixture of water and isopropanol (1:1) and kept at 50° C. while a solution of QUAT 188 in water is added, and the subsequent mixture is heated to 70° C. for 30 minutes. If desired, another 376 parts of the reagent can be added. If the pH value decreased beyond neutral during the reaction, sodium hydroxide or potassium hydroxide was added to raise the pH to 8. When polyamidoamines prepared from $C_{21}$-dicarboxylic acid or $C_{22}$-tricarboxylic acid or anhydride were used for quaternization, water was the suitable solvent for the modification described above.

EXAMPLE 2

This example gives the procedure for particular invention emulsifiers and shows the improved emulsion-/aggregate mixing stability with increasing content of quaternary amino group in the emulsifier molecule. A proper ratio of amidoamine to quaternizing reagent allows to tailor the emulsifier to a given asphalt and aggregate.

Emulsifiers Based on Tall Oil Fatty Acid

A mixture of 200 grams (g) of L-5 (a tall-oil fatty acid derivative commercially available from Westvaco, Inc.) and 100 g of a polyamine blend consisting mainly of aminoethylpiperazine and triethylene tetramine was heated at 210° C. for one hour. The mixture was cooled to 100° C. and isopropanol was slowly added to dilute to an activity of 65%. At room temperature 39 to 117 parts of QUAT 188 (65% active) were added and heated to 70° C. for 30 minutes; after cooling to room temperature, the emulsifier was diluted with water to 50% activity.

Emulsions were prepared from Edgington Hard Base asphalt at 63% asphalt residue and pH 2.0. The emulsifier concentration was 1.5%. Aggregate mixing experiments were carried out with granite screenings (Camak Type II aggregate), using 1 part cement, 12 parts water, 14 parts emulsion, and 100 parts aggregate for the slurry seal formulation. The cohesive strength development over time was determined with a modified cohesion tester. As shown in Table I below, the L-5 derived amidoamine had to be modified with at least 117 parts and 188 per 100 parts amine blend to yield a suitable mixing-grade emulsifier. Emulsion and aggregate were mixed for a minimum of 60 seconds.

Table I also shows that imidazolines prepared from L-5 tall oil fatty acid with diethylene triamine, triethylene tetramine, and aminoethyl ethanol amine post-reacted with QUAT 188 also yield mixing-grade emulsions.

TABLE I

Mixing Experiments Using Emulsions Prepared with Quaternized L-5-Amidoamines at Ambient Temperature

| Emulsion Number | Emulsifier Description | Cohesive Strength (kg × cm) After | | | |
|---|---|---|---|---|---|
| | | 15 | 30 | 45 | 60 min |
| 1. | L-5-Amine blend$^{(a)}$-Q 188$^{(b)}$ (200:100:39) | broke in 10 sec. | | | |
| 2. | L-5-Amine blend$^{(a)}$-Q 188$^{(b)}$ (200:100:78) | broke in 20 sec. | | | |
| 3. | L-5-Amine blend$^{(a)}$-Q 188$^{(b)}$ (200:100:117) | 15.7 | 17.3 | 19.4 | 25.4 |
| 4. | L-5-DMPDA$^{(b)}$-Q 188$^{(b)}$ (200:100:159) | 10.2 | 34.6 | 15.2 | 14.5 |
| 5. | L-5-DETA$^{(d)}$ (Imidazoline)-Q-188$^{(b)}$ (200:150:159) | 8.0 | 8.5 | 10.9 | 13.7 |
| 6. | L-5-AEEA$^{(e)}$ (Imidazoline)-Q-188$^{(b)}$ (280:100:159) | 15.4 | 12.9 | 17.6 | 11.2 |
| 7. | L-5-TETA$^{(f)}$ (Imidazoline)-Q-188$^{(b)}$ (280:100:159) | 9.1 | 13.7 | 8.5 | 18.7 |

Notes:
$^{(a)}$Mixture mainly composed of aminoethyl piperazine and triethylene tetramine.
$^{(b)}$Q 188: QUAT 188 (3-chloro-2-hydroxy propyl-trimethyl ammonium chloride) manufactured by Dow Chemicals.
$^{(c)}$DMAPDA: Dimethylamine propane diamine.
$^{(d)}$DETA: Diethylene triamine.
$^{(e)}$AEEA: Aminoethyl ethanol amine.
$^{(f)}$TETA: Triethylene tetramine.

EXAMPLE 3

This example shows the improvement of aggregate/asphalt emulsion mixing performance when $C_{21}$-dicarboxylic acid (DIACID 1550®)-derived amidoamines post-reacted with QUAT 188 are employed as emulsifiers. (DIACID 1550 is a tall-oil fatty acid derivative commercially available from Westvaco, Inc.)

Preparation of Emulsifiers

Two hundred grams DIACID 1550 and 100 grams of a blend of polyamines consisting mainly of aminoethyl piperazine and triethylene tetramine were heated at 250° C. for one hour. After cooling to 180° C., 140 grams ethylene glycol was added and cooled further to 90° C., when 140 grams water was added (Emulsifier B).

The above amidoamine solution of 50% activity was divided into four 100 gram samples, and to each was added a certain amount of 50% active QUAT 188 (10 to 14 grams) in water solutions at room temperature. The reaction mixture was heated to 70° C. for 30 minutes.

Table II shows the improved mixing performance when the fatty amidoamine precursors are reacted with increasing amounts of the QUAT 188 quaternizing reagent. Also, emulsions prepared with the precursor amidoamine do not pass the ASTM D-244 cement mix test and are classified as rapid-set, whereas many QUAT 188 modified emulsions yield emulsions passing the cement mixing test, classifying them as cationic slow-set emulsions.

TABLE II

Mixing Times of Aggregate/Emulsion Mixes at Various Temperatures$^{(a)}$

| Emulsion Number | Emulsifier$^{(b)}$ Description | Temperature (°F.) | Mixing Time (sec.) | Cement$^{(a)}$ Test Residue(g) |
|---|---|---|---|---|
| 1. | Emulsifier 3$^{(c)}$ | 80 | >180 | 44.8 |
| | | 100 | <5 | |
| 2. | Emulsifier 3 - 10 Q188 | 80 | >180 | 0.4 |
| | | 100 | 15 | |
| 3. | Emulsifier 3 - 20 Q188 | 80 | >180 | 0.1 |
| | | 100 | 35 | |
| 4. | Emulsifier 3 - 30 Q188 | 80 | >180 | 0.3 |
| | | 100 | 65 | |
| 5. | Emulsifier 3 - 40 Q188 | 80 | >180 | 0.2 |
| 6. | Indulin MQK$^{(d)}$ | 80 | 55 | 7.2 |
| 7. | Indulin MQK - 5 Q188 | 80 | 150 | 0.4 |
| 8. | Indulin MQK - 10 Q188 | 80 | 170 | 0.5 |
| 9. | Indulin MQK - 15 Q188 | 80 | >180 | 0.4 |
| 10. | Indulin MQK - 1M$^{(d)}$ | 80 | 15 | 40.1 |
| 11. | Indulin MQK - 1M - 10 Q188 | 80 | 35 | 17.2 |
| 12. | Indulin MQK - 1M - 15 Q188 | 80 | 50 | 14.2 |
| 13. | Indulin MQK - 1M - 25 Q188 | 80 | 90 | 5.4 |

Notes:
$^{(a)}$Emulsions were prepared from Edgington Hard Base asphalt at 63% and pH 2.0. 1.25% emulsifier was used; for the mixing experiments Camak aggregate (granite screenings, Type II) was employed.
$^{(b)}$100 parts emulsifier were reacted with X parts QUAT 188 (Q 188) to give the modified emulsifier.
$^{(c)}$Preparation of emulsifier described under Example II.
$^{(d)}$Commercial amidoamine-type emulsifier.
$^{(e)}$ASTM D-244; weight of the coagulated emulsion/cement residue; less than one gram specifies a cationic slow set emulsion.

TABLE III

Quaternized Amidoamine as Retarders for Aggregate/Emulsion Mixes[a]

| Experiment Number | Retarder Description | Dosage (%) | Temperature (°F.) | Mixing Time (sec) |
|---|---|---|---|---|
| 1. | None Added | — | 80 | 15 |
| 2. | Emulsifier B[b] | 0.03 | 80 | 75 |
|  |  | 0.05 | 80 | >180 |
| 3. | Emulsifier B[b]-40 Q188 | 0.01 | 80 | 45 |
|  |  | 0.02 | 80 | 140 |
|  |  | 0.03 | 80 | 240 |

Notes:
[a] The emulsions were prepared from Edgington Hard Base asphalt at 63% asphalt residue and pH 2.0; 1.25% Indulin MQK - 1M was used as emulsifier. The mixes were carried out with Camak aggregate (granite screenings, Type II). The modified amidoamine break retarder was added to the mixing water and is based on the weight of the aggregate; 100 parts aggregate, 12 parts emulsifier, and 14 parts water were mixed at ambient temperature until break.
[b] The preparation of the emulsifier is described above.

Table III shows that the break of aggregate/emulsion mixes can be sufficient retarded by the addition of a small amount of quaternized DIACID 1550-polyamine condensate.

While the invention has been described and illustrated herein by references to various specific materials, procedures, and examples, it is understood that the invention is not restricted to the particular materials, combinations of materials, and procedures selected for that purpose. Numerous variations of such details can be employed, as will be appreciated by those skilled in the art.

What is claimed is:

1. A paving slurry seal mixture of a cationic aqueous bituminous emulsion and mineral aggregate capable of being worked comprising: a densely graded mineral aggregate passing through No. 4 and at least 80% retained on 200 mesh screen, and from about 15–25%, based on the weight of the aggregate, of an oil-in-water type emulsion; wherein the emulsion is comprised of about 30–80% by weight of the emulsion of bitumen, from about 3–20% by weight of the emulsion of water, and about 0.3–10.0% by weight of the emulsion of a cation-active emulsifier; wherein the emulsifier is selected from the group consisting of reaction products of one or more polyamines reacted in a condensation reaction with a member selected from the group consisting of fatty acids and rosins, and a quaternizing agent selected from the group consisting of 2,3-epoxy-propyl-trimethyl ammonium chloride and 3-chloro-2-hydroxy propyl-trimethyl ammonium chloride.

2. The paving slurry seal mixture of claim 1 wherein the emulsion contains from about 60–70% by weight of bitumen.

3. The paving slurry seal mixture of claim 1 wherein the emulsion contains from about 0.5–2.0% by weight of the cation-active emulsifier.

4. The paving slurry seal mixture of claim 1 wherein the emulsion has a pH in the range of about 1–7.

5. The paving slurry seal mixture of claim 1 wherein the emulsion has a pH in the range of about 2–3.

6. The paving slurry seal mixture of claim 1 wherein the polyamines are selected from the group consisting of: aminoethylpiperazine, dimethylamino propylamine, ethylene diamine, diethylene triamine, triethylene tetramine, tetraethylene pentamine, pentaethylene hexamine and higher homologues, N-aminoethyl propane diamine, N,N'diaminoethyl propane diamine, N,N'-diaminoethyl-substituted butane diamines, pentane diamines, hexane diamines, N-hydroxy ethyl ethylene diamine, 1,3-diaminopropane, 1,4-diaminobutane, 1,5-diaminopentane, 1,6-diaminohexane, 1,4-diazacyclohexane, N-aminoethylpiperazine, N-hydroxyethyl piperazine, N-aminopropylpropane diamine-1,3, N-methyl-N-aminopropylpropane diamine-1,3, and N-aminohexyl-hexane diamine-1,6.

7. The paving slurry seal mixture of claim 1 wherein the polyamines are selected from the group consisting of compounds having the general formulae:

$$H_2NCH_2CH_2NHR$$

where $R=H-$, $CH_3-$, $C_2H_5-$, $C_3H_7-$, $-CH_2CH_2OH$, and $-(CH_2CH_2NH)_xH$ where $x=1-10$, and $$R_1R_2N(CH_2)_yNHR_3$$

where $R_1=H-$, $CH_3-$, $C_2H_5-$, $C_3H_7-$, and $NH_2CH_2CH_2-$, $R_2=H-$, $CH_3-$, and $C_2H_5-$, $R_3=H-$, $CH_3-$, $C_2H_5-$, $C_3H_7-$, and $NH_2CH_2CH_2-$, and $y=2-6$.

8. The paving slurry seal mixture of claim 1 wherein the polyamines are selected from the group consisting of compounds having the general formula:

$$R_1H_2N(CH_2)_xNH_2$$

where $R_1=O$, $S$, $SO$, and $SO_2$, and $x=2-10$.

9. The paving slurry seal mixture of claim 1 wherein the fatty acids contain from 8–20 carbon atoms.

10. The paving slurry seal mixture of claim 1 wherein the rosins contain from 20–22 carbon atoms.

11. A paving slurry seal mixture of a cationic aqueous bituminous emulsion and mineral aggregate capable of being worked comprising: a densely graded mineral aggregate passing through No. 4 and at least 80% retained on 200 mesh screen, and from about 15–25%, based on the weight of the aggregate, of an oil-in-water type emulsion; wherein the emulsion is comprised of about 30–80% by weight of the emulsion of bitumen, from about 3–20% by weight of the emulsion of water, and about 0.3–10.0% by weight of the emulsion of a cation-active emulsifier; wherein the emulsifier is selected from the group produced by reacting one or more polyamines in a condensation reaction with a member selected from the group consisting of fatty acids, rosins, fortified fatty acids, and fortified rosins, to form a member selected from the group consisting of amidoamines, imidazolines, polyamidoamines, and imidoamidoamines, which is further reacted with a quaternizing agent selected from the group consisting of 2,3-epoxy-propyl-trimethyl ammonium chloride and 3-chloro-2-hydroxy propyl-trimethyl ammonium chloride, to produce the emulsifier.

12. The paving slurry seal mixture of claim 11 wherein the emulsion contains from about 60–70% by weight of bitumen.

13. The paving slurry seal mixture of claim 11 wherein the emulsion contains from about 0.5–2.0% by weight of the cation-active emulsifier.

14. The paving slurry seal mixture of claim 11 wherein the emulsion has a pH in the range of about 1–7.

15. The paving slurry seal mixture of claim 11 wherein the emulsion has a pH in the range of about 2–3.

16. The paving slurry seal mixture of claim 11 wherein the polyamines are selected from the group consisting of: aminoethylpiperazine, dimethylamino propylamine, ethylene diamine, diethylene triamine, triethylene tetramine, tetraethylene pentamine, pentaethylene hexamine and higher homologues, N-aminoethyl propane diamine, N,N'diaminoethyl propane diamine, N,N'-diaminoethyl-substituted butane diamines, pentane diamines, hexane diamines, N-hydroxy ethyl ethylene diamine, 1,3-diaminopropane, 1,4-diaminobutane, 1,5-diaminopentane, 1,6-diaminohexane, 1,4-diazacyclohexane, N-aminoethylpiperazine, N-hydroxyethyl piperazine, N-aminopropylpropane diamine-1,3, N-methyl-N-aminopropylpropane diamine-1,3, and N-aminohexylhexane diamine-1,6.

17. The paving slurry seal mixture of claim 11 wherein the polyamines are selected from the group consisting of compounds having the general formulae:

$$H_2NCH_2CH_2NHR$$

where $R=H-$, $CH_3-$, $C_2H_5-$, $C_3H_7-$, $-CH_2CH_2OH$, and $-(CH_2CH_2NH)_xH$ where $x=1-10$, and $$R_1R_2N(CH_2)_yNHR_3$$

where $R_1=H-$, $CH_3-$, $C_2H_5-$, $C_3H_7-$, and $NH_2CH_2CH_2-$, $R_2=H-$, $CH_3-$, and $C_2H_5-$, $R_3=H-$, $CH_3-$, $C_2H_5-$, $C_3H_7-$, and $NH_2CH_2CH_2-$, and $y=2-6$.

18. The paving slurry seal mixture of claim 11 wherein the polyamines are selected from the group consisting of compounds having the general formula:

$$R_1H_2N(CH_2)_xNH_2$$

where $R_1=O$, $S$, $SO$, and $SO_2$, and $x=2-10$.

19. The paving slurry seal mixture of claim 11 wherein the fatty acids contain from 8–20 carbon atoms.

20. The paving slurry seal mixture of claim 11 wherein the rosins contain from 8–20 carbon atoms.

21. The paving slurry seal mixture of claim 11 wherein the fortified fatty acids are condensation reaction products of unsaturated fatty acids with a member of the group consisting of acrylic acid, metacrylic acid, fumaric acid, or maleic anhydride.

22. The paving slurry seal mixture of claim 11 wherein the fortified rosins are condensation reaction products of rosins with a member of the group consisting of acrylic acid, metacrylic acid, fumaric acid, or maleic anhydride.

23. The paving slurry seal mixture of claim 11 wherein the polyaminoamidoamines and imidazolines are further reacted with a member selected from the group consisting of ethylene oxide, propylene oxide, and butylene oxide, prior to being reacted with a quaternizing agent to produce the emulsifier.

24. A paving slurry seal mixture of a cationic aqueous bituminous emulsion and mineral aggregate capable of being worked comprising: a densely graded mineral aggregate passing through No. 4 and at least 80% retained on 200 mesh screen, and from about 15–25%, based on the weight of the aggregate, of an oil-in-water type emulsion; wherein the emulsion is comprised of about 30–80% by weight of the emulsion of bitumen, from about 3–20% by weight of the emulsion of water, and about 0.3–10.0% by weight of the emulsion of a cation-active emulsifier; wherein the emulsifier is selected from the group produced by reacting one or more polyamines in a condensation reaction with a member selected from the group consisting of sulfonated fatty acids and epoxidized esters of unsaturated fatty esters, and further reacted with a quaternizing agent selected from the group consisting of 2,3-epoxypropyl-trimethyl ammonium chloride and 3-chloro-2-hydroxy propyl-trimethyl ammonium chloride, to produce the emulsifier.

25. The paving slurry seal mixture of claim 24 wherein the emulsion contains from about 60–70% by weight of bitumen.

26. The paving slurry seal mixture of claim 24 wherein the emulsion contains from about 0.5–2.0% by weight of the cation-active emulsifier.

27. The paving slurry seal mixture of claim 24 wherein the emulsion has a pH in the range of about 1–7.

28. The paving slurry seal mixture of claim 24 wherein the emulsion has a pH in the range of about 2–3.

29. The paving slurry seal mixture of claim 24 wherein the polyamines are selected from the group consisting of: aminoethylpiperazine, dimethylamino propylamine, ethylene diamine, diethylene triamine, triethylene tetramine, tetraethylene pentamine, pentaethylene hexamine and higher homologues, N-aminoethyl propane diamine, N,N'diaminoethyl propane diamine, N,N'-diaminoethyl-substituted butane diamines, pentane diamines, hexane diamines, N-hydroxy ethyl ethylene diamine, 1,3-diaminopropane, 1,4-diaminobutane, 1,5-diaminopentane, 1,6-diaminohexane, 1,4-diazacyclohexane, N-aminoethylpiperazine, N-hydroxyethyl piperazine, N-aminopropylpropane diamine-1,3, N-methyl-N-aminopropylpropane diamine-1,3, and N-aminohexylhexane diamine-1,6.

30. The paving slurry seal mixture of claim 24 wherein the polyamines are selected from the group consisting of compounds having the general formulae:

$$H_2NCH_2CH_2NHR$$

where $R=H-$, $CH_3-$, $C_2H_5-$, $C_3H_7-$, $-CH_2CH_2OH$, and $-(CH_2CH_2H)_xH$ where $x=1-10$, and $$R_1R_2N(CH_2)_yNHR_3$$

where $R_1=H-$, $CH_3-$, $C_2H_5-$, $C_3H_7-$, and $NH_2CH_2CH_2-$, $R_2=H-$, $CH_3-$, and $C_2H_5-$, $R_3=H-$, $CH_3-$, $C_2H_5-$, $C_3H_7-$, and $NH_2CH_2CH_2-$, and $y=2-6$.

31. The paving slurry seal mixture of claim 24 wherein the polyamines are selected from the group consisting of compounds having the general formula:

$$R_1H_2N(CH_2)_xNH_2$$

where $R_1=O$, $S$, $SO$, and $SO_2$, and $x=2-10$.

32. The paving slurry seal mixture of claim 24 wherein the fatty acids contain from 8–20 carbon atoms.

33. The paving slurry seal mixture of claim 24 wherein the rosins contain from 8–20 carbon atoms.

* * * * *